US007548437B2

(12) United States Patent
Choi et al.

(10) Patent No.: US 7,548,437 B2
(45) Date of Patent: Jun. 16, 2009

(54) SWITCHING MODE POWER SUPPLY

(75) Inventors: Jin-Ho Choi, Seoul (KR); Dong-Young Huh, Gyeonggi-do (KR); Yong-Chul Ryu, Gyeonggi-do (KR)

(73) Assignee: Fairchild Korea Semiconductor, Ltd., Bucheon (KR)

( * ) Notice: Subject to any disclaimer, the term of this patent is extended or adjusted under 35 U.S.C. 154(b) by 87 days.

(21) Appl. No.: 11/121,334

(22) Filed: May 3, 2005

(65) Prior Publication Data

US 2005/0270808 A1 Dec. 8, 2005

(30) Foreign Application Priority Data

May 3, 2004 (KR) ..................... 10-2004-0031006

(51) Int. Cl.
*H02M 3/335* (2006.01)

(52) U.S. Cl. ............... 363/21.09; 363/21.07; 363/21.17

(58) Field of Classification Search .................. 363/15, 363/19-20, 21.04, 21.07, 21.09, 21.12, 21.15-21.18, 363/23, 74, 78-80; 323/299, 304, 311, 313-315, 323/317, 902

See application file for complete search history.

(56) References Cited

U.S. PATENT DOCUMENTS 4,885,674 A * 12/1989 Varga et al. ............. 363/21.09
5,872,704 A * 2/1999 Kim ........................... 363/20
5,995,384 A * 11/1999 Majid et al. ............. 363/21.18
6,252,783 B1 * 6/2001 Huh et al. ................ 363/21.01
6,385,061 B1 * 5/2002 Turchi et al. ............ 363/21.15
7,002,814 B2 * 2/2006 Kim et al. ................ 363/21.15
7,016,204 B2 * 3/2006 Yang et al. ............... 363/21.13
7,212,417 B2 * 5/2007 Fukumoto ................ 363/21.15
7,248,486 B2 * 7/2007 Schonleitner et al. .... 363/21.04

* cited by examiner

*Primary Examiner*—Shawn Riley
(74) *Attorney, Agent, or Firm*—Sidley Austin LLP

(57) ABSTRACT

A switching mode power supply (SMPS) is presented to compensate for variations of maximum output power caused by variations of input power. The output power varies according to variations of input power because of a propagation delay of the SMPS. To compensate for the propagation delay, a reference voltage for turning off a switching MOS transistor is differently established depending on the input voltage. The variation of maximum output power according to the input voltage is prevented by differentiating the turned-off time of the reference voltage for turning off a main switch, such as a switching MOS transistor according to the input voltage.

20 Claims, 5 Drawing Sheets

100 400 Vin D1 Vout BD R1 L1 L2 C1 R3 AC Vin' Cin PC1 Amp1 R2 Qsw R4 Vg Vref Control module 500 Vsense 320 Rsense 200 Vcc D2 Vfb Cfb PC2 C2 L3 300

100
400
R3
R4
Amp1
PC1
Vout
C1
D1
L2
L1
Qsw
Vsense
Rsense
300
L3
D2
C2
Vcc
320
Control module
Vg
PC2
Vfb
Cfb
200
Cin
Vin
R1
Vin'
R2
500
BD
AC 320
322
322a
MOS transistor driver
324
324a
CP1
Amp2
Amp3
Q1
Q2
Qsw
Rsense
Vsense
Vg
Vcp
Vcp'
Va
Va'
Vin
Vin'
Vfb
Cin
Cfb
PC2
R1
R2
R5
R6
R7
R8
R9
D3
D4
D5
i_1
i_2
i_3
i_4
i_5
i_6

SWITCHING MODE POWER SUPPLY

CROSS REFERENCE TO RELATED APPLICATION

This application claims priority to and the benefit of Korea Patent Application No. 10-2004-31006 filed on May 3, 2004 in the Korean Intellectual Property Office, the entire content of which is incorporated herein by reference.

BACKGROUND

1. Field of the Invention

The present invention relates to a switching mode power supply (SMPS). More specifically, the present invention relates to a switching mode power supply for compensating for variations of maximum output power caused by variations of an input power.

2. Description of the Related Art

A switching mode power supply (SMPS) is a device for converting a direct current (DC) supply voltage into a DC output voltage. The DC output voltage can be greater or less than the DC supply voltage. The switching mode power supply is mainly used for battery-based power supplies installed in electronic devices such as mobile phones and laptop computers. Such electronic devices are operable in a normal operation mode with a relatively large amount of power consumption and a standby operation mode with a relatively small amount of power consumption.

However, conventional switching mode power supplies generate unstable output power because of propagation delays generated by elements of the switching mode power supply when the input voltage is varied. Propagation delays include internal propagation delays of a controller and turned-off delay times of a switch.

FIG. 1 shows the current flowing to a main switch coupled to the primary side of a general switching mode power supply in the ideal case of no propagation delay. In typical configurations the main switch is a MOSFET and the current is the drain current of a MOSFET. In such ideal configurations the peak current flowing to the main switch is controlled to be constant according to feedback information (i1P) at an output terminal even when the input voltage varies. This feedback ensures that the maximum power transmitted to the output terminal is controlled to be constant.

FIG. 2 shows the main switch current on the primary side of a general switching mode power supply with propagation delay. The peak currents of the main switch are different depending on the input voltage when a propagation delay of Δt is generated in the SMPS. Without a propagation delay for low and high Vin input voltages the times to reach the i1P peak current are t1 and t2, respectively. With a propagation delay the main switch current continues rising after t1 or t2, and therefore the peak current varies depending on the input voltage. In detail, since the main switch current's gradient di/dt=Vin1/L1 is small for low a input voltage, and the gradient di/dt=Vin2/L1 is large for a high input voltage, the peak currents i1 and i2, reached after the propagation delay Δt, are different.

The difference of the peak currents on the primary side causes the maximum output power at the output terminal depend on the input power because of the presence of the propagation delay of the SMPS.

SUMMARY

Briefly and generally, embodiments of the present invention include a switching mode power supply (SMPS) for controlling variations of maximum output power generated by a propagation delay.

In some embodiments, a switching mode power supply (SMPS) includes a power supply including a main switch coupled to a primary coil of a transformer, and supplying power to a secondary coil of the transformer according to an operation of the main switch; an input voltage sensor for sensing a level of an input voltage; and a switching controller for comparing a first voltage which corresponds to the input voltage sensed by the input voltage sensor with a second voltage which corresponds to the current flowing through the main switch, and outputting a control signal for controlling a duty of the main switch to the main switch.

In some embodiments the first voltage is inversely proportional to the input voltage.

In some embodiments a peak current flowing through the main switch is substantially constant irrespective of the input voltage.

In some embodiments of the present invention, a switching mode power supply (SMPS) includes a power supply including a main switch coupled to a primary coil of a transformer, and supplying power to a secondary coil of the transformer according to an operation of the main switch; an input voltage sensor for sensing a level of an input voltage; a feedback circuit for generating a feedback voltage which corresponds to a voltage output to the secondary coil of the transformer; and a switching controller for comparing the input voltage sensed by the input voltage sensor, a first voltage which corresponds to the feedback voltage, and a second voltage which corresponds to the current flowing through the main switch, and outputting a control signal for controlling the duty of the main switch to the main switch.

In some embodiments the first voltage is inversely proportional to the sensed input voltage.

In some embodiments the switching controller outputs a control signal for turning off the main switch when the first voltage substantially corresponds to the second voltage.

The currents flowing through the main switch are substantially the same irrespective of the sensed input voltage when the main switch is turned off after the same is turned on.

In some embodiments of the present invention, a switching mode power supply (SMPS) includes a power supply including a main switch coupled to a primary coil of a transformer, and supplying power to a secondary coil of the transformer according to an operation of the main switch; an input voltage sensor for sensing an input voltage; and a switching controller for controlling the peak current flowing through the main switch to be constant irrespective of the sensed input voltage. The peak current varies according to a voltage output to the secondary coil of the transformer.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION

Figure 1:
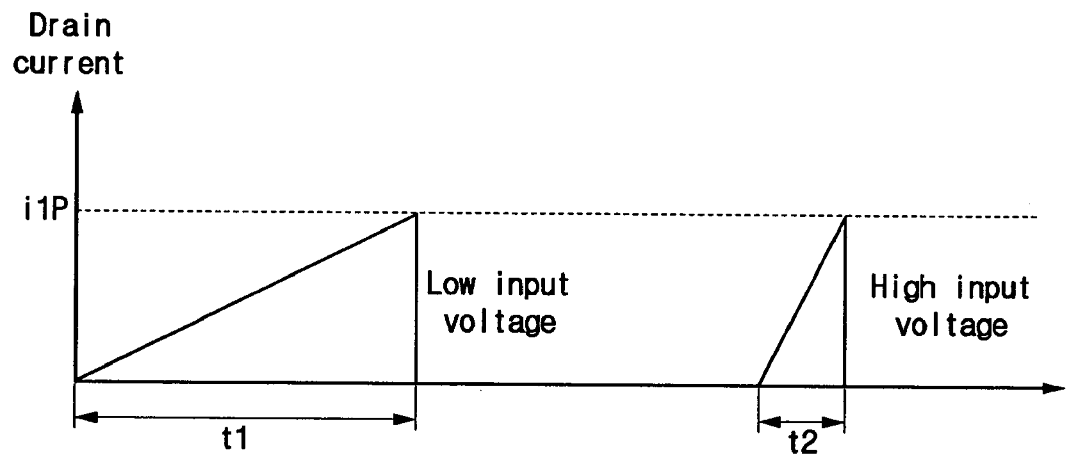
FIG. 1 shows a main switch current coupled to the primary side of a general switching mode power supply in the ideal case of no propagation delay.
Figure 2:
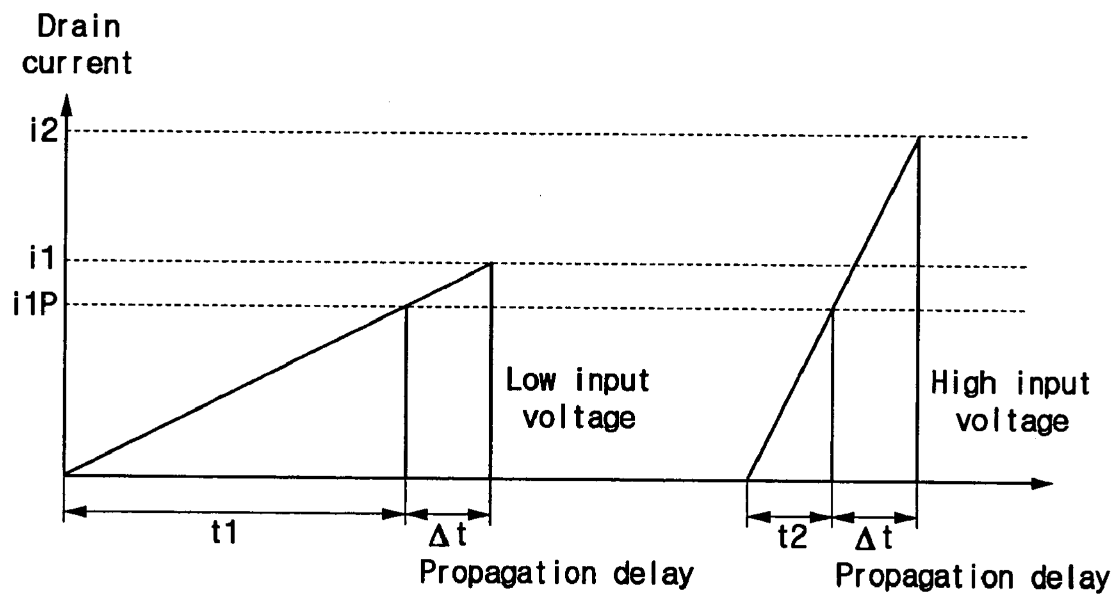
FIG. 2 shows a main switch current coupled to the primary side of a general switching mode power supply with a propagation delay.

In the following detailed description, only certain embodiments of the invention has been shown and described, simply by way of illustration of the best mode contemplated by the inventors of carrying out the invention. As will be realized, the invention is capable of modification in various obvious respects, all without departing from the invention. Accordingly, the drawings and description are to be regarded as illustrative in nature, and not restrictive. To clarify the present invention, parts which are not described in the specification are omitted, and parts for which the same descriptions are provided have the same reference numerals.

Figure 3:
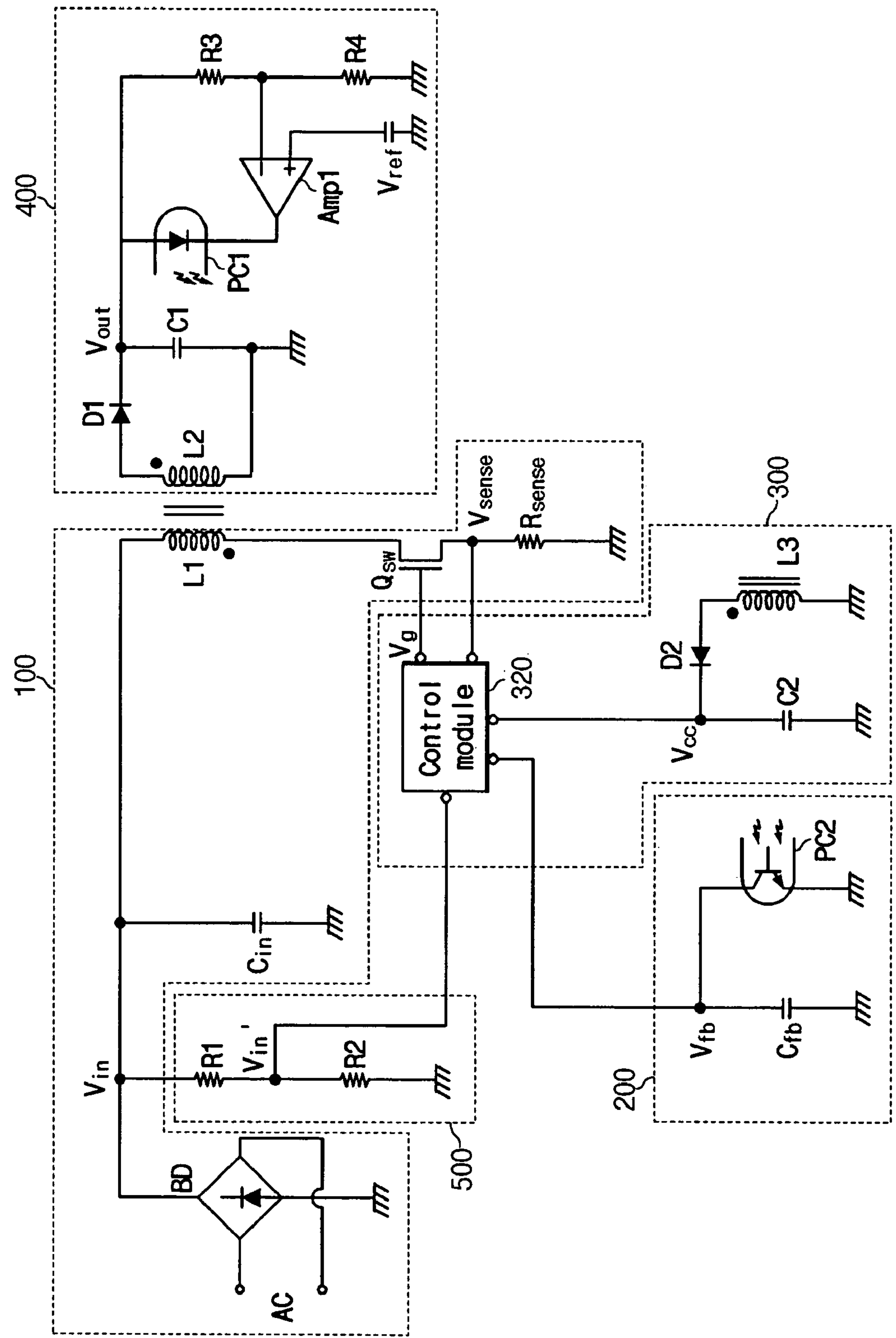
FIG. 3 shows an SMPS circuit according to an embodiment of the present invention.

FIG. 3 shows an SMPS circuit according to an embodiment of the present invention. The SMPS circuit includes a power supply 100, a feedback circuit 200, a switching controller 300, an output unit 400, and an input voltage sensor 500.

The power supply 100 includes a bridge diode BD for rectifying an input AC voltage into a Vin rectified voltage on a primary voltage rail, a capacitor Cin, coupled between the primary voltage rail and the ground, for smoothing the rectified voltage, and a primary coil L1 of a transformer coupled to the primary voltage rail to receive the rectified voltage Vin. Furthermore, a main switch includes a switching MOS transistor Qsw, coupled to the primary coil L1, and a sense resistor Rsense coupled between a source of switching MOS transistor Qsw and the ground for sensing the current which flows through the switching MOS transistor Qsw. The main switch may include a transistor of a type different from MOSFETs.

The input voltage Vin of power supply 100 generates an output voltage Vout in the secondary coil according to the duty of switching MOS transistor Qsw. The SMPS includes a feedback loop, sensing output voltage Vout and using the sensed value to control the duty of switching MOS transistor Qsw and accordingly regulate the output voltage.

Output unit 400 includes a diode D1 having an anode coupled to the secondary coil L2 of the transformer and a cathode, where output voltage Vout is produced, a capacitor C1 coupled between the cathode of the diode D1 and the ground, and resistors R3 and R4 coupled in series between the cathode of the diode D1 and the ground. Output unit 400 further includes an error amplifier Amp1 for receiving a voltage at a node between the resistors R3 and R4 through an inverting terminal and a reference voltage of Vref through a non-inverting terminal, and a photo diode PC1 coupled between an output terminal of the error amplifier Amp1 and the cathode of diode D1.

Output unit 400 outputs a constant output voltage Vout to a load and senses a sensed feedback voltage Vsfb related to output voltage Vout to feedback circuit 200 in order to regulate the output voltage. In the present embodiment, sensed feedback voltage Vsfb is generated by dividing output voltage Vout by resistors R1 and R2, thus Vsfb=R3/(R3+R4)*Vout. Sensed feedback voltage Vsfb and reference voltage Vref are input to the inverting terminal and the non-inverting terminal of error amplifier Amp1, respectively. These voltages are then compared to determine the current output by error amplifier Amp1 to photo diode PC1. Photo diode PC1 is part of a photo coupler together with a photo transistor PC2 of feedback circuit 200 and provides information corresponding to output voltage Vout to feedback circuit 200.

Feedback circuit 200 includes photo transistor PC2, which is part of the photo coupler together with photo diode PC1, and a capacitor Cfb coupled in parallel to photo transistor PC2 at a feedback node with a feedback voltage Vfb. Photo transistor PC2 generates a current corresponding to the output voltage of error amplifier Amp1 and can thought of as a dependent current source. In other words, photo transistor PC2 controls the current corresponding to output voltage Vout, so that a relatively large amount of current flows to photo transistor PC2 to reduce feedback voltage Vfb when output voltage Vout is high, and a relatively small amount of current flows to photo transistor PC2 to increase feedback voltage Vfb when output voltage Vout is low. By this mechanism information corresponding to output voltage Vout is sensed by feedback circuit 200 and is input to switching controller 300. This information is used to control the duty of switching MOS transistor Qsw.

Input voltage sensor 500 includes resistors R1 and R2 coupled in series between the primary voltage rail and the ground. A node between resistors R1 and R2 is coupled to switching controller 300. At this node input voltage Vin is sensed and divided to generate sensed input voltage Vin': Vin'=R2/(r1+r2)*Vin. Vin' is input to switching controller 300 and is used to control the switching duty of switching MOS transistor Qsw. This embodiment controls the variation of the maximum output power due to the propagation delay by adjusting the duty according to input voltage Vin, as described below.

Switching controller 300 includes a control module 320, a diode D2 having an anode coupled to a secondary coil L3 and a cathode coupled to a secondary Vcc node, and a capacitor C2 coupled between secondary Vcc node and the ground. Secondary coil L3 generates current pulses, powered by the switching operation of power supply 100. Capacitor C2 and diode D2 rectify and smooth the current pulses generated by secondary coil L3 to generate a substantially constant voltage Vcc at secondary Vcc node. Secondary Vcc node is coupled into control module 320. The Vcc voltage is used as a bias voltage by control module 320.

Control module 320 receives sensed input voltage Vin' , feedback voltage Vfb, and a sense voltage Vsense, sensing the current which flows between the drain and the source of switching MOS transistor Qsw. In response, control module 320 outputs a gate voltage Vg for controlling the switching of switching MOS transistor Qsw.

Figure 4:
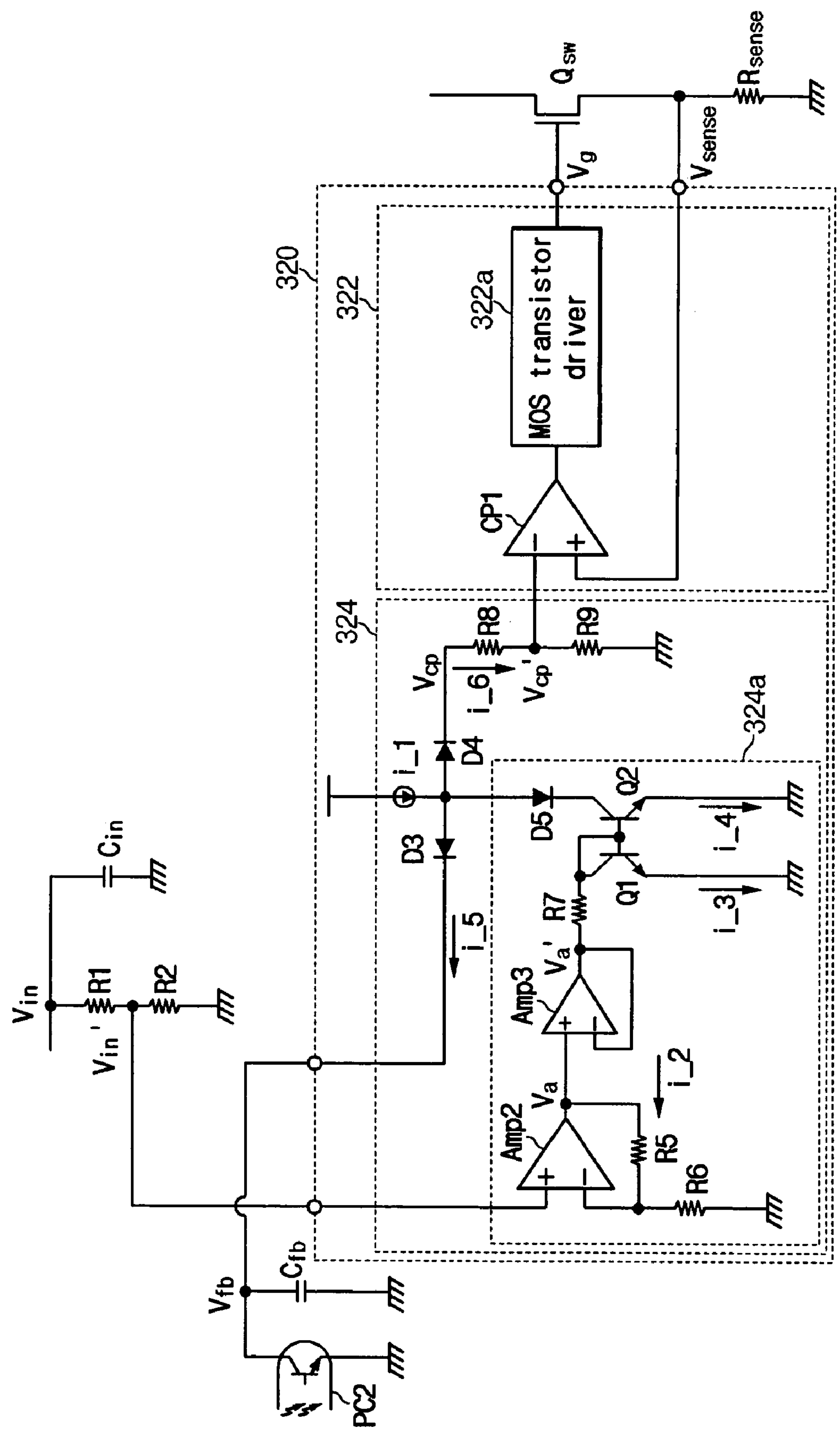
FIG. 4 shows a detailed circuit diagram of a control module according to an embodiment of the present invention.

FIG. 4 shows a detailed circuit diagram of control module 320 according to an embodiment of the present invention. Control module 320 includes a switching driver 322 for controlling the turn on/off of switching MOS transistor Qsw, and a switching control signal generator 324 for outputting a switching control voltage Vcp' to switching driver 322.

Switching driver 322 includes a comparator CP1 for receiving switching control voltage Vcp' through an inverting terminal of comparator CP1 and sense voltage Vsense through a non-inverting terminal, and a MOS transistor driver 322*a* for receiving an output voltage from comparator CP1. MOS transistor driver 322*a* outputs gate voltage Vg for controlling the switching operation of switching MOS transistor Qsw.

Switching control signal generator 324 includes a current source i_1, a diode having an anode coupled to current source i_1 and a cathode coupled to feedback voltage Vfb, a diode D4 having an anode coupled to current source i_1, resistors R8 and R9 coupled in series between a cathode of diode D4 and the ground, and a maximum power controller 324*a* for receiving sensed input voltage Vin' and controlling the maximum output power.

The maximum power controller 324*a* includes an amplifier Amp2 for receiving sensed input voltage of Vin' through a non-inverting terminal; a resistor R8 coupled between an inverting terminal of amplifier Amp2 and the ground; a resistor R5 coupled between the inverting terminal of amplifier Amp2 and an output terminal of amplifier Amp2; a voltage follower Amp3 for outputting a voltage at the output terminal of amplifier Amp2; a resistor R7 having a first terminal coupled to an output terminal of voltage follower Amp3; a transistor Q1 having a collector coupled to a second terminal of the resistor R7, having a base coupled to the collector, and having a grounded emitter; a transistor Q2 having a base coupled to the base of transistor Q1 and having a grounded emitter; and a diode D5 having a cathode coupled to the collector of transistor Q2 and having an anode coupled to current source i_1. Voltage follower Amp3 transmits an output voltage Va output by amplifier Amp2 to a voltage node Va' and prevents the supply of current i_3 to amplifier Amp2. Transistors Q1 and Q2 form a current mirror to duplicate current i_3 flowing to the emitter of transistor Q1 a predetermined number of times, and transmit the duplicated current to the emitter of transistor Q2.

Figure 5:
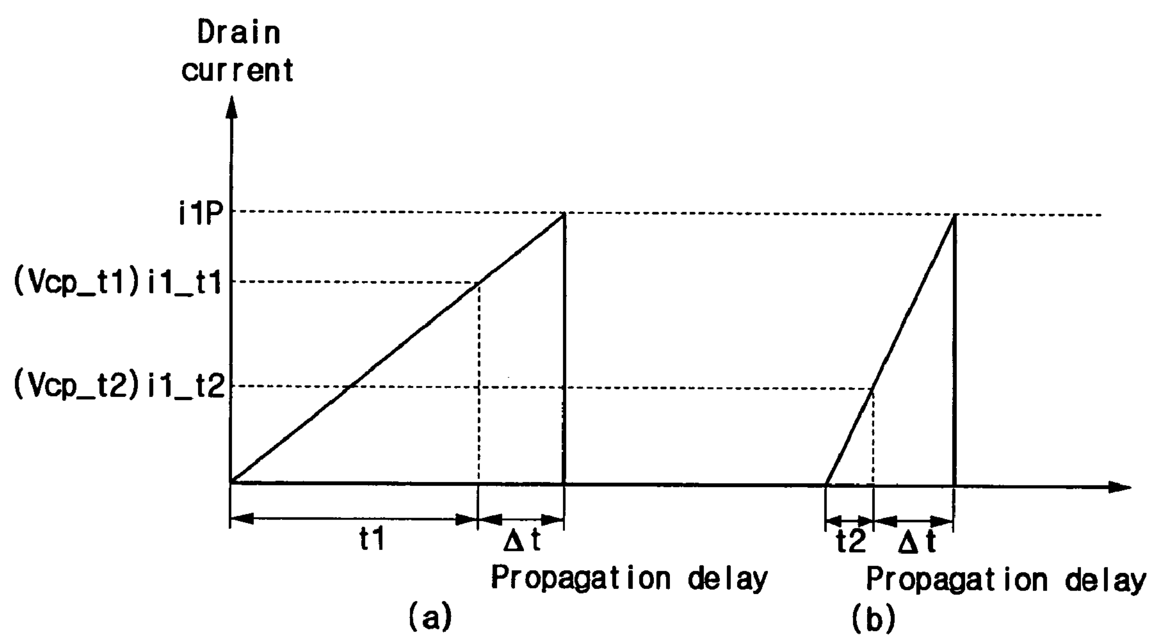
FIG. 5 shows a constant peak drain current of a switching MOS transistor when a switching control voltage (a reference voltage) input to a non-inverting terminal of a comparator is varied according to an input voltage in consideration of the propagation delay according to an embodiment of the present invention.
Figure 6:
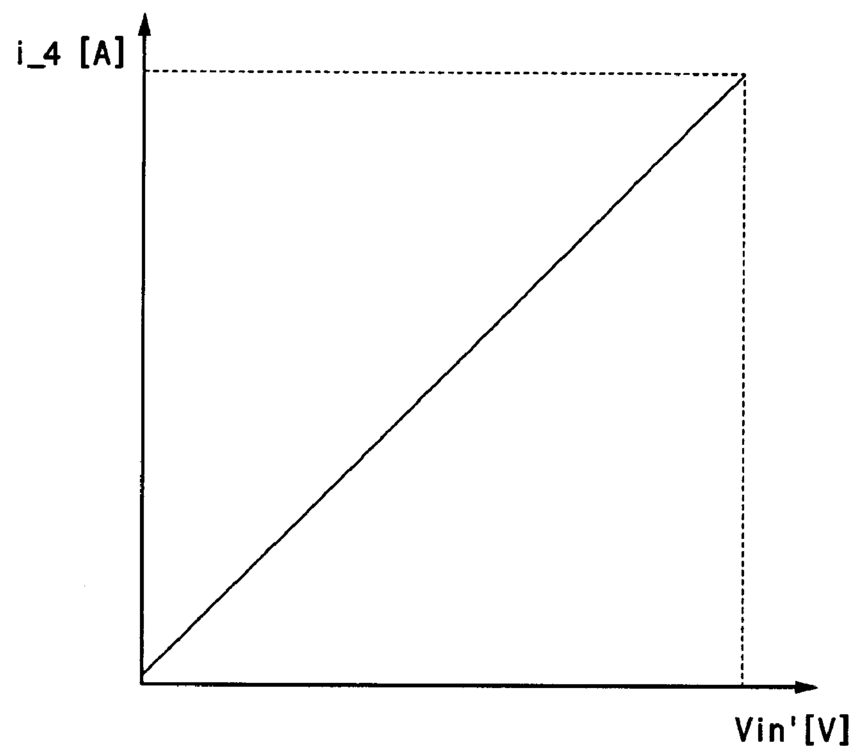
FIG. 6 shows a graph of an input sense voltage and a current flowing to a base of a transistor according to an embodiment of the present invention.
Figure 7:
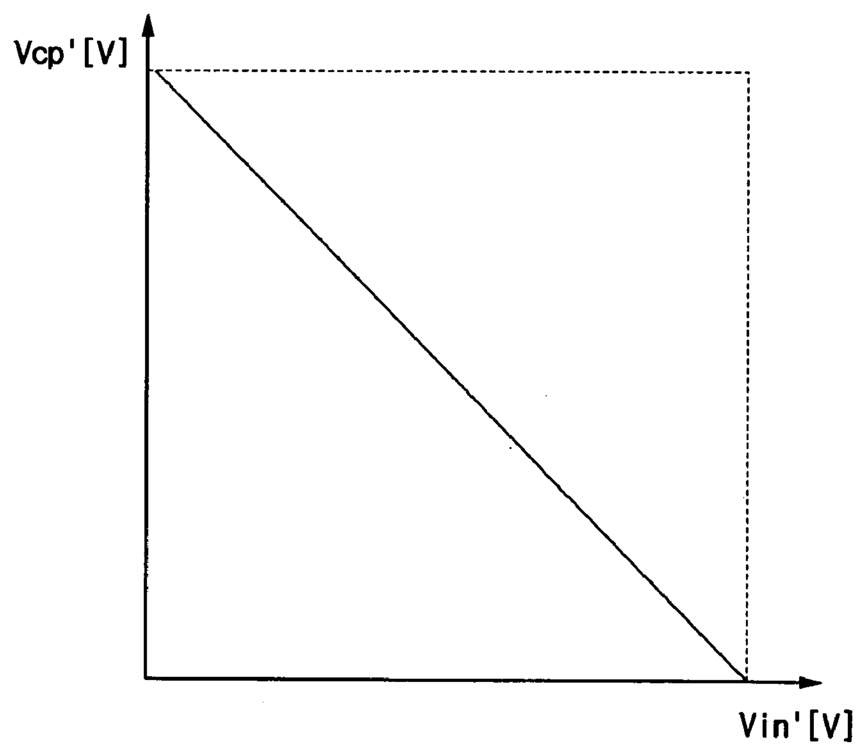
FIG. 7 shows a graph of an input sense voltage and a switching control voltage input to an inverting terminal of a comparator according to an embodiment of the present invention.

FIGS. 5-7 illustrate the operation of the SMPS. FIG. 5 shows a constant peak drain current of switching MOS transistor Qsw, when switching control voltage Vcp' input to the inverting terminal of comparator CP1 varies according to an input voltage according to an embodiment of the present invention with propagation delay.

FIG. 6 shows a graph of sensed input voltage of Vin' and a current of i_4 flowing to a base of transistor Q2 according to an embodiment of the present invention.

FIG. 7 shows a graph of sensed input voltage of Vin' and switching control voltage Vcp' input to the inverting terminal of comparator CP1 according to an embodiment of the present invention.

Next, sensed input voltage Vin' and current i_4 flowing to the emitter of transistor Q2 will be described. Output voltage Va of amplifier Amp2 and sensed input voltage Vin' are related as:

$$Va = \frac{(R5 + R6)}{R6} Vin' \tag{1}$$

Output voltage Va of amplifier Amp2 is given by Equation (1), since the voltage at the non-inverting terminal of amplifier Amp2 corresponds to the voltage at the inverting terminal thereof and hence Va=(R5+R6)*i_2.

Output voltage Va of amplifier Amp2 substantially corresponds to output voltage Va' of voltage follower Amp3 according to the operation of voltage follower Amp3. Current i_3 flowing to the emitter of transistor Q1 is given by Equation 2, when transistor Q1 is turned on:

$$i\_3 = \frac{Va - 0.7}{R7} \tag{2}$$

Since transistors Q1 and Q2 form a current mirror and i_4=k*i_3 holds, current i_4 flowing to the emitter of transistor Q2 satisfies:

$$i\_4 = k\left[\frac{(R5 + R6)}{R6} Vin' - 0.7\right] \Big/ R7 \tag{3}$$

In words, current i_4 is proportional to sensed input voltage Vin':

$$i\_4 \propto Vin' \tag{4}$$

This relationship is shown in FIG. 6.

Also, current i_4 and input voltage Vin satisfy Equation 5 since sensed input voltage Vin' and input voltage Vin are related as Vin'=R2/(R1+R2)*Vin.

$$i\_4 \propto Vin \tag{5}$$

Equation 5 shows that the maximum power controller 324*a* generates current i_4 proportional to input voltage Vin.

The currents flowing to resistors R8 and R9 are controlled through input voltage Vin and switching control voltage Vcp' input to the inverting terminal of comparator CP1.

A method for establishing switching control voltage Vcp' input to the inverting terminal of comparator CP1 according to input voltage. Vin will now be described in detail.

In general, switching control voltage Vcp' varies according to feedback voltage Vfb. Feedback voltage Vfb is determined by output voltage Vout of output unit 400. Feedback voltage Vfb controls current i_6 flowing to resistors R8 and R9 so that switching control voltage Vcp' at the inverting input terminal of comparator CP1 varies, and output voltage Vout is accordingly regulated through this feedback process. When current i_4 flowing through diode D5 of maximum power controller 324*a* varies depending on input voltage Vin, currents i_1, i_5, i_4, and i_6 satisfy Equation 6:

$$i\_1 = i\_5 + i\_4 + i\_6 \tag{6}$$

Current i_5 flowing through diode D3 regulates variations of output voltage Vout of output unit 400 according to the load. Current i_4 is not related to current i_5. Therefore, Equation 6 can be rewritten as Equation 7 by discarding current i_5 in the case of compensating for the variation of maximum output power according to input voltage Vin because of the existence of a propagation delay:

$$i\_1 = i\_4 + i\_6 \tag{7}$$

Current i_6 varies according to current i_4 since current i_1 is constant. That is, current i_6 decreases when current i_4 increases, and current i_6 increases when current i_4 decreases. Hence, current i_6 is controlled by current i_4 in proportion to input voltage Vin. Current i_6 is proportional to switching control voltage Vcp' since switching control voltage Vcp' is input to the non-inverting terminal of comparator CP1 and current i_6 satisfies Vcp'=i_6*R9. Therefore, the relation between the voltages of Vin and Vcp' satisfies the graph of FIG. 7 with reference to Equation 7:

Switching control voltage Vcp' and input voltage Vin satisfy the graph of FIG. 7, since sensed input voltage Vin' is proportional to input voltage Vin. Therefore, switching control voltage Vcp' decreases when input voltage Vin increases, and switching control voltage Vcp' increases when input voltage Vin decreases.

Switching control voltage Vcp' also serves as a reference voltage for turning off switching MOS transistor Qsw. Comparator CP1 compares sense voltage Vsense, sensing the current flowing through the drain of switching MOS transistor Qsw with switching control voltage Vcp' , varied by input voltage Vin. Comparator CP1 outputs a signal for keeping switching MOS transistor Qsw on when sense voltage Vsense is less than switching control voltage Vcp' , and outputs a signal for turning off switching MOS transistor Qsw when sense voltage Vsense is greater than switching control voltage Vcp'. MOS transistor driver 322*a* drives switching MOS transistor Qsw in response to the signals output by comparator CP1.

A method for solving the problem in which the existence of propagation delay varies the peak drain current of i1P flowing through switching MOS transistor Qsw according to input voltage Vin and thereby controlling the peak drain current i1P will be described with reference to FIGS. 5*a-b*.

FIGS. 5*a-b* shows that the gradient di/dt=Vin/L1 of the current flowing through the drain of switching MOS transistor Qsw varies according to input voltage Vin. As shown in FIG. 5*a*, the drain current, flowing through the drain of switching MOS transistor Qsw increases with a small gradient when input voltage Vin is low. As shown in FIG. 5*b*, the drain current increases with large gradient when input voltage Vin is high.

When input voltage Vin is low, switching control voltage Vcp' increases and switching control voltage Vcp' at time t1, Vcp_t1, a reference voltage for turning off switching MOS transistor Qsw increases. Hence, comparator CP1 outputs a reference signal for turning off switching MOS transistor Qsw at time t1.

When the input voltage of Vin is high, switching control voltage Vcp' decreases, and the switching control voltage at time t2, Vcp_t2, a reference voltage for turning off switching MOS transistor Qsw decreases. Hence, comparator CP1 outputs a reference signal for turning off switching MOS transistor Qsw at time t2.

Since the case of a large input voltage Vin and the case of a lesser input voltage Vin have the same propagation delay Δt, when the reference voltages for turning off switching MOS transistor Qsw vary to assume the values Vcp_t1 and Vcp_t2 respectively, switching MOS transistor Qsw is turned off at the same drain current i1P.

Accordingly, the time for turning off switching MOS transistor Qsw after the same is turned on is appropriately controlled by differentiating reference voltage Vcp' for turning off switching MOS transistor Qsw according to input voltage Vin. In this case, the drain currents when switching MOS transistor Qsw is turned off are the same since propagation delay Δt is the same. That is, the variation of peak current i1P of switching MOS transistor Qsw which would be generated by the variation of input voltage Vin and the propagation delay of the SMPS is prevented by differentiating reference voltage Vcp' for turning off switching MOS transistor Qsw according to input voltage Vin.

In summary, embodiments of the invention control the maximum power output by output unit 400 to be constant by controlling the peak current of switching MOS transistor Qsw to be constant irrespective of input voltage Vin.

While this invention has been described in connection with specific embodiments, it is understood that the invention is not limited to the disclosed embodiments, but, on the contrary, is intended to cover various modifications and equivalent arrangements included within the spirit and scope of the appended claims.

What is claimed is:

1. A switching mode power supply (SMPS), comprising:

a power supply including a main switch coupled to a primary coil of a transformer, configured to supply power to a secondary coil of the transformer according to an operation of the main switch;

an input voltage sensor, configured to sense a level of an input voltage; and a switching controller, configured to compare a first voltage, combined from the sensed input voltage and a feedback voltage, with a second voltage which corresponds to the current flowing through the main switch, and to output a corresponding control signal for controlling a duty of the main switch.

2. The SMPS of claim 1, wherein the SMPS is operable so that the first voltage is decreased when the input voltage is increased.

3. The SMPS of claim 1, wherein the SMPS is operable so that a peak current flowing through the main switch is substantially constant irrespective of the input voltage.

4. The SMPS of claim 1, wherein the SMPS is operable so that the second voltage is proportional to the current flowing through the main switch; and the switching controller outputs a control signal for turning off the main switch when the first voltage substantially corresponds to the second voltage.

5. The SMPS of claim 1, wherein the switching controller comprises:

a switching control signal generator for generating the first voltage which corresponds to the input voltage sensed by the input voltage sensor, generating a switching control signal for controlling the duty of the main switch, and outputting the switching control signal; and a switching driver for comparing the switching control signal with the second voltage, and controlling the main switch to be turned on and off.

6. The SMPS of claim 5, wherein the switching control signal generator comprises:

a maximum power controller for generating a current corresponding to the input voltage;

a current source;

a first diode having an anode coupled to the current source; and a first resistor and a second resistor coupled in series to a cathode of the first diode.

7. The SMPS of claim 6, wherein:

the power supply further comprises a third resistor coupled to the main switch for sensing the current flowing through the main switch; and the switching driver comprises:

a comparator for comparing the first voltage of a node between the first resistor and the second resistor with the second voltage sensed by the third resistor; and a switch driver for outputting a signal for driving the main switch in response to an output signal of the comparator.

8. The SMPS of claim 6, wherein the SMPS is operable so that the current generated by the maximum power controller is proportional to the input voltage, and the voltage at the node between the first and second resistors is decreased when the input voltage is increased.

9. The SMES of claim 6, wherein the maximum power controller comprises:
- a first amplifier having a first terminal for receiving an input voltage sensed by the input voltage sensor;
- a fourth resistor coupled between a second terminal of the first amplifier and the ground;
- a fifth resistor coupled between the second terminal of the first amplifier and a third terminal of the first amplifier;
- a voltage follower for receiving a voltage at the third terminal of the first amplifier and outputting the voltage;
- a sixth resistor having a first terminal coupled to an output terminal of the voltage follower;
- a current mirror, coupled to the sixth resistor, for duplicating the current flowing through the sixth resistor a predetermined number of times; and
- a second diode having an anode coupled to the sixth resistor and a cathode coupled to the current mirror.

10. The SMPS of claim 1, further comprising:
- an output unit for outputting an output voltage corresponding to a power supplied by the power supply; and
- a feedback circuit including a dependent current source with currents variable by the output voltage, and a first capacitor coupled in parallel to the dependent current source.

11. The SMPS of claim 10, wherein the output unit comprises:
- first diode having an anode coupled to the second coil of the transformer;
- a second capacitor coupled between a cathode of the first diode and the ground;
- a first resistor and a second resistor coupled in series between the cathode of the first diode and the ground;
- an amplifier having a first terminal for receiving a voltage at the node between the first and second resistors, and a second terminal for receiving a reference voltage; and
- a photo diode coupled between a third terminal of the amplifier and the cathode of the first diode.

12. The SMPS of claim 11, wherein the dependent current source of the feedback circuit is a photo transistor, which is part of a photo coupler together with the photo diode.

13. The SMPS of claim 1, wherein the input voltage sensor includes a first resistor and a second resistor in series, coupled to the input voltage, and the sensed input voltage level is a voltage level of the node between the first and second resistors.

14. A switching mode power supply (SMPS) comprising:
- a power supply including a main switch coupled to a primary coil of a transformer, and supplying power to a secondary coil of the transformer according to an operation of the main switch;
- an input voltage sensor, configured to sense a level of an input voltage;
- a feedback circuit, configured to generate a feedback voltage which corresponds to a voltage output by the secondary coil of the transformer; and
- a switching controller, configured to compare a first voltage, combined from the sensed input voltage and the feedback voltage, and a second voltage which corresponds to the current flowing through the main switch, and to output a corresponding control signal for controlling a duty of the main switch.

15. The SMPS of claim 14, wherein the SMPS is operable so that the first voltage is decreased when the sensed input voltage is increased.

16. The SMPS of claim 15, wherein the switching controller outputs a control signal for turning off the main switch when the first voltage substantially corresponds to the second voltage.

17. The SMPS of claim 14, wherein the SMPS is operable so that the currents flowing through the main switch are substantially the same irrespective of the sensed input voltage when the main switch is turned off after the same is turned on.

18. A switching mode power supply (SMPS) comprising:
- a power supply including a main switch coupled to a primary coil of a transformer, configured to supply power to a secondary coil of the transformer according to an operation of the main switch;
- an input voltage sensor configured to sense an input voltage; and
- a switching controller configured to control a peak current flowing through the main switch to be constant irrespective of the sensed input voltage and a delay time, wherein the power supply has a delay time.

19. The SMPS of claim 18, wherein the SMPS is operable so that the peak current is varied according to a voltage output to the secondary coil of the transformer.

20. The SMPS of claim 18, wherein the SMPS is operable so that the switching controller establishes a control voltage which is decreased when the input voltage is increased, compares the control voltage with the sense voltage which corresponds to the current flowing through the main switch, and generates and outputs a control signal for turning off the main switch.

* * * * *